United States Patent [19]

Espy

[11] 4,216,619
[45] Aug. 12, 1980

[54] HORTICULTURE DEVICE FOR ROTATING PLANTS DUE TO TRANSPIRATION AND EVAPORATION OF MOISTURE

[76] Inventor: Calvin L. Espy, 2203 Riverbrook Rd., Decatur, Ga. 30035

[21] Appl. No.: 12,078

[22] Filed: Feb. 14, 1979

[51] Int. Cl.² ............................................. A01C 11/00
[52] U.S. Cl. ...................................... 47/67; 74/89.15; 185/27; 211/1.5; 248/220.2
[58] Field of Search ......................... 47/39, 67, 71, 65; 211/1.5; 248/220.2, 317, 318; 185/4–9, 27, 28, 35, 36; 74/89.15, 424.8 R

[56] References Cited

U.S. PATENT DOCUMENTS

| 813,378 | 2/1906 | Hagan | 74/424.8 R |
|---|---|---|---|
| 1,080,593 | 12/1913 | Schilling et al. | 185/27 |
| 1,970,452 | 8/1934 | Grubman | 185/27 |
| 2,251,364 | 8/1941 | McIlhon | 74/127 |
| 2,699,650 | 1/1955 | Parsons | 40/473 X |
| 4,005,843 | 2/1977 | Wengel | 47/39 X |
| 4,078,625 | 3/1978 | Loeb | 47/67 X |
| 4,117,630 | 10/1978 | Kalas | 47/67 |

FOREIGN PATENT DOCUMENTS 2500 of 1894 United Kingdom ...................... 47/39

Primary Examiner—Edgar S. Burr
Assistant Examiner—James R. Feyrer
Attorney, Agent, or Firm—Quaintance, Murphy & Richardson

[57] ABSTRACT

A horticulture device is provided for rotating a plant as moisture transpires from the plant and evaporates from the container holding the plant. The device includes a spring which is linearly distorted due to gravity as the plant is watered and which is restored as the plant releases the water and the water evaporates from the container. The spring is connected to a motion converting mechanism that converts linear distortion of the spring to rotational motion which in turn is used to rotate the plant.

12 Claims, 4 Drawing Figures

HORTICULTURE DEVICE FOR ROTATING PLANTS DUE TO TRANSPIRATION AND EVAPORATION OF MOISTURE

BACKGROUND OF THE INVENTION

In order to have healthy attractive plants it is necessary to water the plants as well as to provide the plants with adequate light. In many settings, plants are able to obtain sufficient light from only one direction. For example, a plant placed in a room near a window will receive relatively strong sun light on the side facing the window and relatively weak light on the other side. Over a period of time this can cause the plant to grow asymmetrically and therefore not be as attractive as it might have been with uniform light exposure.

In order to distribute light evenly over the entire plant, it is necessary to frequently rotate the plant. The prior art includes devices, such as spring driven platforms and weight driven suspension systems which slowly rotate plants in order to provide uniform exposure to sun light. However, these devices are not entirely satisfactory because they add another chore to plant care which is likely to be ignored once the novelty of using the device wears off.

OBJECTS OF THE INVENTION

It is an object of the instant invention to provide a new and improved horticulture device for rotating plants conveniently.

It is a further object of the instant invention to provide a new and improved horticulture device for both rotating a plant container and indicating the moisture content of the container.

It is a further object of the instant invention to provide a new and improved horticulture device for rotating plants wherein rotation of the plant is accomplished due to evaporation of water.

It is a further object of the instant invention to provide a new and improved horticulture device for rotating plants wherein indication is provided that the plants need water as well as that the plants have stopped rotating.

It is a further object of the instant invention to provide a horticulture device for rotating plants wherein the device is self contained and requires no winding springs, batteries, electric lines, or the like, for its operation.

It is a further object of the instant invention to provide a new and improved horticulture device for rotating plants wherein the device is energized for rotation by simply watering the plants.

SUMMARY OF THE INVENTION

In view of the foregoing objects, and other objects, the instant invention contemplates a horticultural device for rotating a plant wherein the device includes a support and spring means mounted on the support in a configuration in which the spring means distorts due to the application of gravitational force. The spring means is attached to a device for converting linear motion to rotary motion upon the application or relief of gravitational force and the converting device is connected to a container carrying both the plant and water for the plant. The instant invention further contemplates an indicating means which is operable upon distortion of the spring means in order to display the water content of the carrying means which content is proportional to the gravitational force on the spring.

DESCRIPTION OF THE PREFERRED EMBODIMENT

Figure 1:
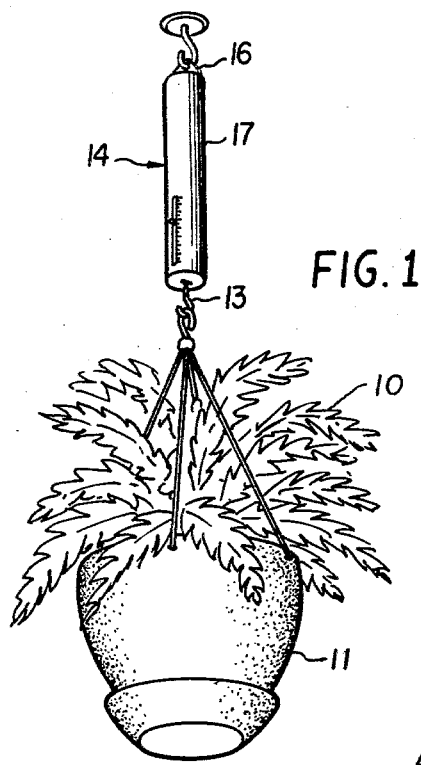
FIG. 1 is a side view showing the device of the instant invention supporting a plant.
Figure 3:
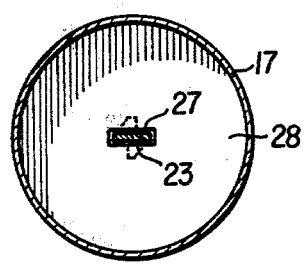
FIG. 3 is a bottom view of the instant invention showing a stop-slot for causing rotation of a sprial member as the spiral member moves vertically.

Referring now to FIG. 1, there is shown a plant 10 which is contained in a carrying device such as a pot or container 11 that is in turn supported by lines 12 on a hook 13 connected to a plant rotator 14, which is the subject of the instant invention. The plant rotator 14 rotates the hook 13 so as to rotate the pot or container 11 and thereby uniformly distribute localized light over the entire plant 10. Rotation of the plant 10 results in uniform exposure of the plant which encourages the plant to grow symmetrically.

Figure 2:
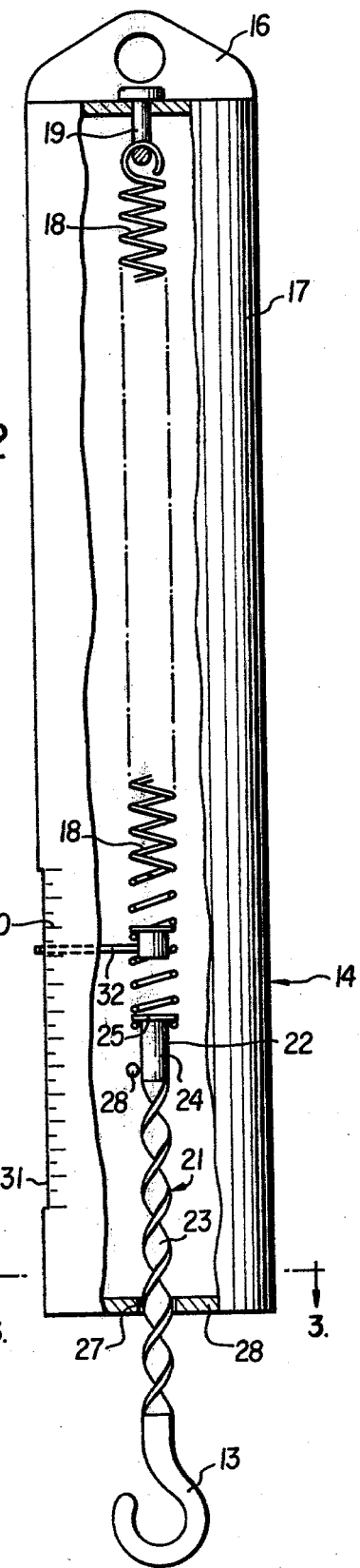
FIG. 2 is a side view of the device of the instant invention with a portion of a surrounding housing broken away to show the interior mechanism of the invention.

Referring now to FIG. 2, it is seen that the rotator 14 has a loop or other attaching device 16 at the top thereof so that the rotating device may be suspended from a ceiling, boom, or other structure. Preferably, the rotating device 14 includes a tubular housing 17 in which an elongated spring 18 is suspended. The elongated spring 18 may be a coil spring and is attached at its upper end to an anchor 19 which is secured within the tubular housing 17. At its lower end, the spring is connected to a shaft 21 which has a cylindrical, smooth shaft portion 22 and a spiral portion 23. Preferably, the spring 18 has a circular eye 24 on one end thereof through which the shaft 22 is journaled and held therein by a head 25 having a diameter greater than the diameter of the eye 24. The spiral portion of the spring 21 extends past and rests within a stop-slot 27 extending across the bottom surface 28 of the tubular housing 17.

Figure 4:
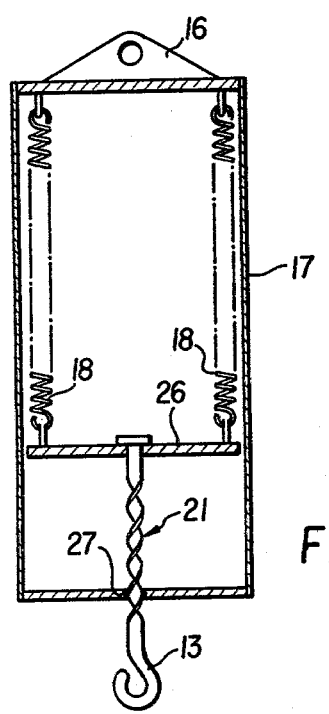
FIG. 4 is a side view of another embodiment of the invention.

FIG. 4 shows an alternative configuration in which a plurality (two) of springs 18 may be used wherein the springs are arranged in parallel and are connected to a platform 26 through which the shaft 21 is journaled. By using such an arrangement the device 14 can be shorter or rotate heavier plants.

In the preferred embodiment, the spiral 23 presents a relatively flat surface which is progressively twisted about an axis aligned with its length to present a rotating flat surface to the stop-slot 27. Consequently, as the spiral 23 is moved longitudinally while held in engagement with the stop-slot 27, the spiral will rotate. In order to stabilize the shaft 21 upon which the spiral 23 is formed, a stop bar 28 engages the shaft along the cylindrical shank portion 22 which cooperates with the stop-slot 27 to provide additional lateral support for the shaft. All that is really necessary is to provide some structure which presents a surface fixed with respect to the housing 17 against which the spiral 23 bares in order to impose rotary motion on the shaft 21 as the shaft moves axially so as, in effect, to convert linear motion of the shaft to rotary motion.

Upon pouring water into the pot 11 (see FIG. 1) the shaft 21 moves downwardly so as to linearly tension the spring 18. As the water evaporates, the tension on the spring 18 decreases because the pot 11 becomes lighter and the gravitational force less. This causes the spring 18 to lift the shaft 21 pulling the spiral 23 through the stop-slot 27. Since the stop-slot 27 is fixed, shaft 21 will rotate, thereby rotating the pot 11 and the plant 10 growing therein.

In order to indicate when the plant 10 has sufficient water or to indicate when water is needed, graduations 30 are placed on the side of the tubular housing 17 adjacent to a slot 31 through the side of the tubular housing. A pointer 32, which is carried by the spring 18, is moved vertically in the slot 31 as the spring 18 is extended and retracted. The pointer 32 may be coupled to the spring by a cylindrical plug 33 contained in the coil of the spring. If the plant 10 needs water, the pointer 32 will be located relatively high with respect to the graduations 30. If the plant 10 has sufficient water and is rotating, the pointer 32 will be positioned relatively low with respect to the graduations 30.

In order to prevent the spiral 23 from dropping too far the stop bar 28 is mounted in the housing 17 so as to abut the eye 24 of the spring 18 and the head 25 of the shaft 21. It is readily seen from the foregoing discussion that a plant rotator with a moisture indicator is provided in which rotation of a plant is accomplished by simply watering the plant and an indication is given that the plant needs water by a pointer operated by the rotator.

The foregoing example is merely illustrative of the instant invention which should be limited only by the following claims:

What is claimed is:

1. A horticulture device for rotating a plant container and its contents, the device comprising:
    a support;
    spring means distortable by the weight of the container;
    means for mounting the spring means on the support in a configuration such that the spring means supports and is distorted by the gravitational force of the plant container and its contents;
    means for rotating said plant container and its contents simultaneously with distortion of said spring means said rotating means including means attached to the spring means for converting linear motion to rotary motion upon a change in the gravitational force from the plant container and its contents applied to the spring means, and means connected to the motion converting means for attaching the plant container and its contents thereto, whereby watering the plant container and its contents distorts the spring means from an initial state and whereby evaporation and transpiration of the water permits the spring means to be restored to its initial state and to rotate the plant container and its contents.

2. The horticulture device of claim 1 further including: indicator means operable upon distortion of the spring means, for displaying the water content of the plant container which content is proportioned to the gravitational force on the spring means.

3. The horticulture device of claim 1 wherein the spring means comprises at least one coil spring and the means for mounting the spring means is an anchor which suspends the spring by one end.

4. The horticultural device of claim 3 wherein the motion converting means is attached to the other end of the spring means and includes: a shaft with a spiral surface thereon; stop means for engaging the spiral surface to rotate the shaft as the shaft is moved past the stop means by the spring means due to decreased gravitational force on the spring means.

5. The horticultural device of claim 4 wherein the support is a tube which surrounds the spring means and has a hanging means at one end for hanging the tube, and wherein the stop means is a slot extending across the bottom of the tube.

6. The horticulture device of claim 5 further including: a slot formed in the side of the tube; graduations disposed adjacent to the slot, and a pointer attached to the spring means wherein the pointer moves down as the spring means is tensioned to indicate increasing amount of water in the plant container and wherein the pointer moves up as the spring tension is relieved to indicate decreasing amounts of water in the plant carrying means.

7. The horticulture device of claim 4 further including indicator means operable upon distortion of the spring means to display the water content of the plant container which content is proportioned to the gravitational force of the spring means.

8. The horticulture device of claims 4, 5, 6 or 7 further including stop means for limiting downward motion of the shaft.

9. The horticulture device of claims 4, 5, 6 or 7 wherein the spring means includes a pair of coil springs.

10. A horticulture device for rotating a plant container and its contents, comprising:
    a container for holding a plant;
    spring means;
    means for mounting the spring means in a configuration in which the spring means distorts due to the application of gravitational force;
    means attached to the spring means for converting linear motion to rotary motion upon a change in the gravitational force applied to the spring means, and means for connecting the container to said motion converting means, whereby watering the plant distorts the spring means to actuate the motion converting means to turn the plant in one direction due to an increase in gravitational force caused by water added to said plant container and whereby evaporation and transpiration of the water decreases the gravitational force and allows the spring to retract resulting in the motion converting means rotating the plant container in a direction opposite to said one direction.

11. The horticulture device of claim 10 further including: indicator means operable upon distortion of the spring means, for displaying the water content of the plant container which content is proportioned to the gravitational force on the spring.

12. The hoticulture device of claim 10 wherein the spring means comprises at least one coil spring and the means for mounting the spring means is an anchor which suspends the spring means by one end.

* * * * *